(12) United States Patent
Walker et al.

(10) Patent No.: US 8,775,392 B1
(45) Date of Patent: Jul. 8, 2014

(54) REVISION CONTROL AND CONFIGURATION MANAGEMENT

(75) Inventors: Gavin William Walker, Cambridge (GB); Robert Olson Aberg, South Grafton, MA (US)

(73) Assignee: The Math Works, Inc., Natick, MA (US)

( * ) Notice: Subject to any disclaimer, the term of this patent is extended or adjusted under 35 U.S.C. 154(b) by 169 days.

(21) Appl. No.: 13/155,059

(22) Filed: Jun. 7, 2011

(51) Int. Cl.
*G06F 17/30* (2006.01)

(52) U.S. Cl.
USPC .......................................................... 707/695

(58) Field of Classification Search
USPC ........................................ 707/693, 695, 697
See application file for complete search history.

(56) References Cited

U.S. PATENT DOCUMENTS

| | | | |
|---|---|---|---|
| 5,692,196 A * | 11/1997 | Unni et al. ..................... | 717/145 |
| 2007/0220068 A1* | 9/2007 | Thompson et al. ............ | 707/203 |
| 2009/0219576 A1* | 9/2009 | Akiyama et al. ............. | 358/1.16 |
| 2009/0271442 A1* | 10/2009 | Young et al. .................. | 707/200 |
| 2009/0271451 A1* | 10/2009 | Young et al. .................. | 707/203 |
| 2011/0113257 A1* | 5/2011 | Basin et al. ................... | 713/189 |

OTHER PUBLICATIONS

Openoffice.org—Uncompress OpenOffice files for better storage in version control [online], stackoverflow.com [retrieved on Sep. 6, 2011]. Retrieved from the Internet: <url:stackoverflow.com//questions/975167/uncompress-openoffice-files-for-better-storage-in-version-control>.
Management of opendocument (openoffice.org) files in git [online], git@vger.kernel.org [retrieved on Sep. 6, 2011]. Retrieved from the Internet: <url:permalink.gmane.org/gmane.comp.version-control.git/95951>.
Mfriedenhagen/store_zippies_uncompressed/wiki/Home-Bitbucket [online], bitbucket by Atlassian [retrieved on Sep. 6, 2011]. Retrieved from the Internet: <url:bitbucket.org/mfriedenhagen/store_zippies_uncompressed/wiki/Home>.
Open Packaging Conventions—Wikipedia, the free encyclopedia [online], Wikipedia [retrieved on Sep. 6, 2011]. Retrieved from the Internet: <url:en.wikipedia.org/wiki/Open_Packaging_Conventions>.

* cited by examiner

*Primary Examiner* — Khanh Pham
(74) *Attorney, Agent, or Firm* — Venable LLP; Michael A. Sartori; Todd R. Farnsworth

(57) ABSTRACT

In an illustrative embodiment, an apparatus, computer-readable medium, or method may be configured to manage a configuration. Files may be inserted into a file container in a computing environment and state information on the files may be stored. A change to a file in the file container may be received. A comparison result may be obtained by comparing a previous version of the file container to the file container after receiving the change to the file. The comparison result may be provided.

34 Claims, 11 Drawing Sheets

```xml
- <statefile version="1.0">
    - <file fullpath="Metadata/Thumbnail.png">
        <filesize>7421</filesize>
        <modified>25-Apr-0020</modified>
        <checksum>2098BFEF</checksum>
        <nonfunctional>true</nonfunctional>
      </file>
    - <file fullpath="Metadata/coreproperties.xml">
        <filesize>647</filesize>
        <modified>08-Oct-0001</modified>
        <checksum>39126513</checksum>
        <nonfunctional>false</nonfunctional>
      </file>
    - <file fullpath="[Content_Types].xml">
        <filesize>591</filesize>
        <modified>13-Aug-0001</modified>
        <checksum>398307D7</checksum>
        <nonfunctional>false</nonfunctional>
      </file>
    - <file fullpath="_rels/.rels">
        <filesize>624</filesize>
        <modified>15-Sep-0001</modified>
        <checksum>964FC1A</checksum>
        <nonfunctional>false</nonfunctional>
      </file>
    - <file fullpath="simulink/_rels/blockdiagram.xml.rels">
        <filesize>304</filesize>
        <modified>30-Oct-0000</modified>
        <checksum>39DA120E</checksum>
        <nonfunctional>false</nonfunctional>
      </file>
    - <file fullpath="simulink/bdmxdata.mat">
        <filesize>14584</filesize>
        <modified>05-Dec-0039</modified>
        <checksum>390D3564</checksum>
        <nonfunctional>false</nonfunctional>
      </file>
    - <file fullpath="simulink/blockdiagram.xml">
        <filesize>95171</filesize>
        <modified>26-Jul-0260</modified>
        <checksum>1CEE3EA1</checksum>
        <nonfunctional>false</nonfunctional>
      </file>
  </statefile>
```

```xml
- <change_categorization version="1.0">
  - <container extension=".slx">
    - <file pattern="*.png">
        <nonfunctional>true</nonfunctional>
      </file>
    - <file pattern="*.jpg">
        <nonfunctional>true</nonfunctional>
      </file>
    - <file pattern="*.gif">
        <nonfunctional>true</nonfunctional>
      </file>
    - <file pattern="*.ico">
        <nonfunctional>true</nonfunctional>
      </file>
    - <file pattern="*.png">
        <nonfunctional>true</nonfunctional>
      </file>
    - <file pattern="*.png">
        <nonfunctional>true</nonfunctional>
      </file>
  </container>
</change_categorization>
```

FIG. 7

REVISION CONTROL AND CONFIGURATION MANAGEMENT

BACKGROUND SECTION

Some computing applications may store multiple files inside a single file called a file container. For example, software products such as PKZIP® and WinZip® may compress and store multiple files as a single zip file.

Some computer applications may store multiple files in a file container to assist in compartmentalizing information that may have been previously stored in a single file. For example, the Open Packaging Conventions (OPC) is a container-file specification that may be used to store information that in the past may have been stored in a single file. The OPC specification describes how to store Extensible Markup Language (XML) and non-XML files together to form a single file. Microsoft® Word 2007, for example, creates a .docx file that may be a compressed file container that complies with the OPC standard and may contain many files.

BRIEF DESCRIPTION OF THE DRAWINGS

The accompanying drawings, which are incorporated in and constitute a part of this specification, illustrate one or more embodiments of the invention and, together with the description, explain one or more illustrative embodiments of the invention. In the drawings.

FIG. 6 illustrates an example state file that may maintain state information in an illustrative embodiment of the invention;

FIG. 7 illustrates an example change categorization file in an illustrative embodiment of the invention;

DETAILED DESCRIPTION

Overview

Figure 1:
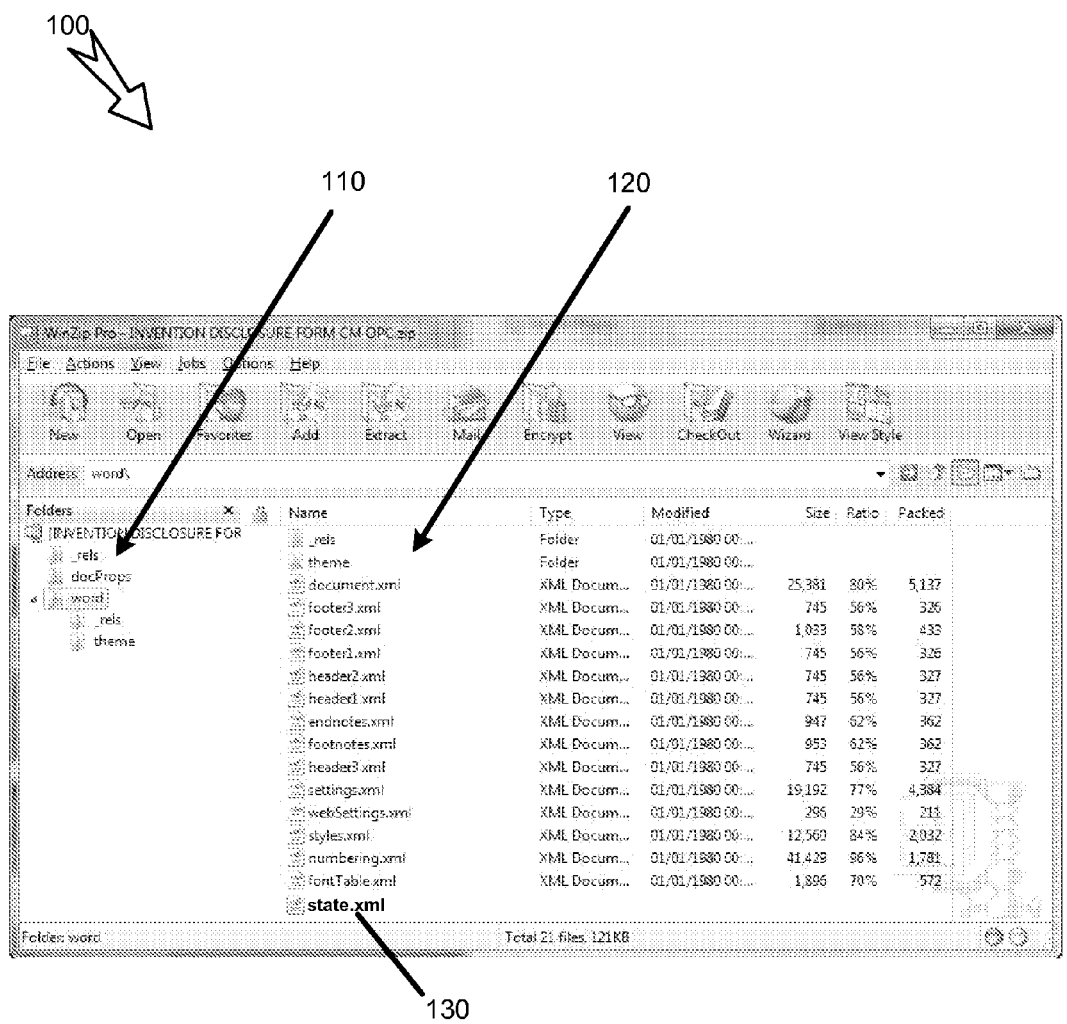
FIG. 1 illustrates an example screen-shot of a file container configured to practice an illustrative embodiment.

During the creation of software applications, for example, source code and data files may be created, accessed, and modified by multiple people. Software versioning applications or configuration management tools, such as Concurrent Versions System (CVS), Subversion, ClearCase, Perforce, etc. may assist in tracking changes to files by assigning version numbers to the files.

Conventional tools such as CVS may perform configuration management (CM) or Software Configuration Management (SCM) of a container-file as a single, monolithic file. Current CM tools may not look inside a file container to detect changes to the individual files within the file container.

By way of example, a conventional technique may allow viewing a typical Microsoft Word 2007 document using Windows Explorer. The Word 2007 document may be displayed as a single .docx file. Using a CM tool to archive the Word document may save the .docx file. However, the .docx file may actually be a file container, which may contain many files. Yet the CM tool may manage the .docx as a single entity and not as a file container. Thus, changes to a single file within the .docx container may require a new version of the entire .docx file to be checked into the SCM Tool.

Exemplary embodiments of the invention allow for creating container files that can hold one or more files. Embodiments further allow the container files to be used with configuration management applications for maintaining and tracking changes to the file containers and files included in the containers. In addition, embodiments allow for interacting with particular files within the container. For example, embodiments can allow a particular file to be checked out of the container and for an updated file to be inserted into the container without having to regenerate the entire container as was required using conventional techniques. Embodiments further provide mechanisms for indexing and tracking files included in a container, such as through the use of a manifest, metadata, etc. These tracking mechanisms may be examined by a user or application to determine the contents of the container, states of the contents (e.g., revision information), characteristics of the contents (e.g., size, format, etc.), etc., without having to unpack the container and examine each container file individually.

By way of example, an exemplary embodiment can use a container-file, such as an OPC compliant file container, with a configuration management application to provide increased efficiency and enhanced insight into changes of files in a container and with respect to the interaction between files within a file container. The exemplary embodiment may provide a user with a greater understanding of a set of changes, the testing required to validate them, and the impact that they might have on the overall design.

An exemplary embodiment may provide the ability to look inside a file container to give users control and understanding of changes to the files in the file container. Users may ask questions about the impact of changes within the file container. For example, providing CM for a file container "engine.slx" in a conventional CM tool may only be able to detect that the file "engine.slx" has changed. However, an exemplary embodiment may detect that, for example, only an image file within the file container "engine.slx" has changed. In this situation, where only an image file has changed, recompilation of the software application may not be required. Thus, detecting which files changed may assist in determining the level of testing and qualification or requalification that the user might have to perform as a consequence of changing the file container "engine.slx."

The ability to look inside a file container and perform change detection on individual files within the file container may provide fine grained analysis of the changes to the constituent parts of the container, allowing appropriate reviews to take place, impact analysis to be performed, etc.

Illustrative Examples

FIG. 1 illustrates an example screen-shot of a file container 100 configured to practice an illustrative embodiment. File container 100 may be a single file that contains multiple directories 110 and files 120 including state file 130. The contents of file container 100 may be viewed through a software application such as WinZip Pro®. Directories 110, within file container 100, may be used to organize files 120. Files 120 may exist in file container 100 under directories 110. Directories 110 and files 120 may be added or removed from file container 100. Both directories 110 and files 120 may be exported from file container 100.

In an illustrative embodiment, when a file container 100 is first created, or checked-out from a SCM tool, or otherwise indicated as being about to be worked upon, the contents of file container 100 (e.g., the files 120) may be examined. In an embodiment, state information on files 120 within file container 100 may be recorded in state file 130 and/or included as metadata inside the file container 100, for example. State information may assist in detecting changes and types of changes to files 120.

State information may include, for example, a list of the files 120 within file container 100, file paths within file container 100, file sizes, file modification dates, MD5 checksums, etc. State file 130 may also be called an augmented manifest file. State file 130 may be included with file container 100. State file 130 may be listed with files 120 and/or viewed in directories 110. State file 130 may be designated as distinct from user files in files 120.

When file container 100 is scheduled to be committed back into the SCM tool, or at another event, files 120 within file container 100 may be examined and the state information within file container 100 may be updated with any changed file information. In one embodiment, changed files may be committed into the SCM tool while unchanged files may not be committed into the SCM tool. The file container with the changed file may also be committed into the SCM tool.

Comparing two versions of a file container 100 can include comparing state information for the respective file containers to determine which, if any, of files 120 contained in file container 100 have changed. The results of the comparison may be presented to a user in various forms. For example, a summary of the changes may be presented in the form of a list. Alternatively, a filtered summary annotated with information describing how the file changes are likely to change the behavior of one or more files in container 100 may be presented. For example, certain file changes (e.g., code changes to software) may be flagged as being highly significant. However, other changes, for example, to bitmaps within file container 100 may be flagged as cosmetic.

Once a summary of the changes is presented, a user may request the appropriate comparisons of changed files 120 stored within file container 100. The comparison may be used to determine if the user's working copy of files 120 is sufficiently up-to-date (e.g., the changes with respect to the CM system are non-functional changes).

The location where file container 100 may be stored (e.g., local disk, network drive, etc.) may have an impact upon the cost associated with retrieving file container 100 from its current location to a location where analysis may be performed. A cost may be measured according to the time it takes to open the file, network bandwidth and/or use associated with opening the file, and/or other measures. Thus, retrieving a file from files 120 from file container 100 may be more efficient (e.g., have a lower cost) than retrieving the entire file container 100. In an embodiment, only changed files and/or only changed functional files may be retrieved and not the entire file container 100.

Example System

Figure 2:
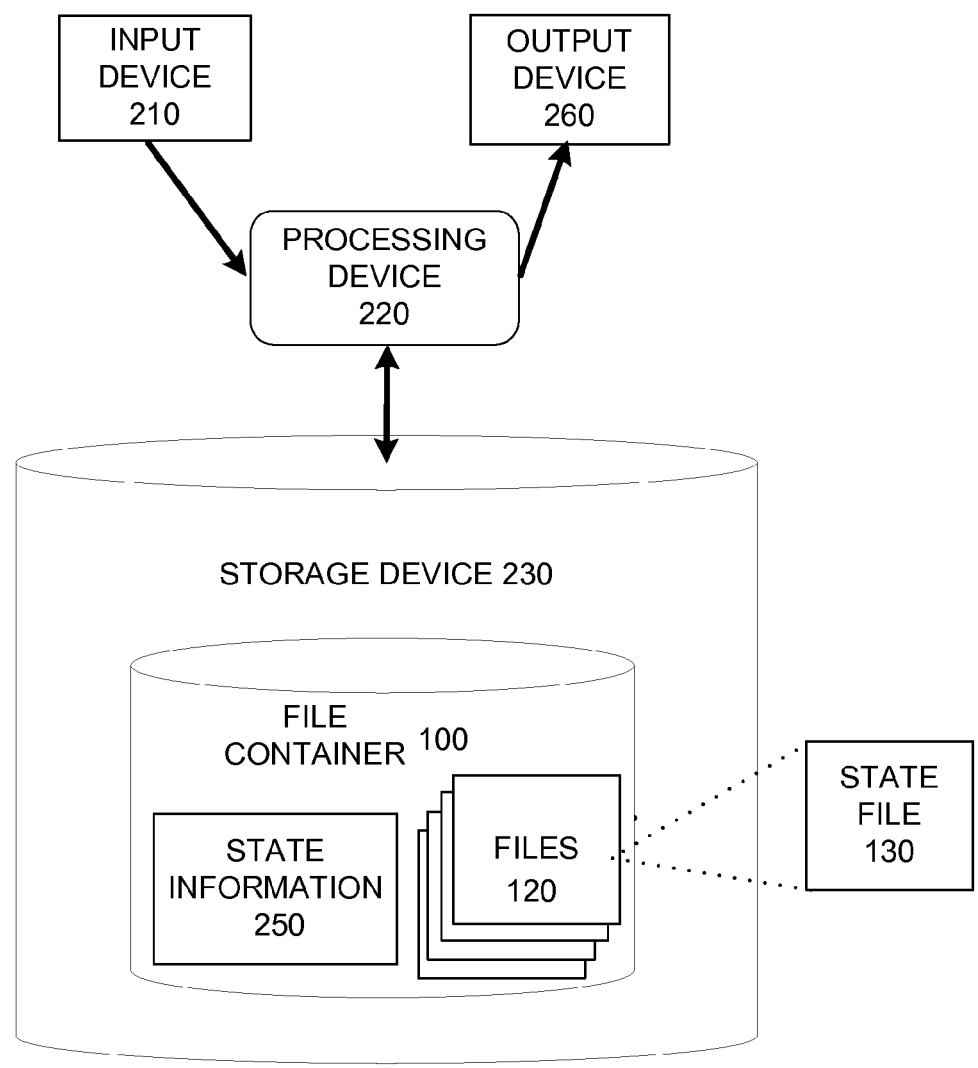
FIG. 2 illustrates an example processing system configured to practice an illustrative embodiment.

FIG. 2 illustrates example processing system 200 configured to practice an illustrative embodiment. In the illustrative embodiment of FIG. 2, system 200 may include input device 210, processing device 220, storage 230, file container 100, files 120, state information 250, and output device 260. State information 250 may be contained with state file 130 which may be contained in files 120.

Input device 210 may include a device for providing inputs to processing device 220. For example, input device 210 may receive input from a user or another device. Input device 210 may include, for example, a keyboard, track ball, touch sensitive display, haptic device, microphone, brain-computer interface, etc.

Processing device 220 may include logic configured to execute computer-executable instructions that implement illustrative embodiments. The instructions may reside in storage 230. An example processing device that may be used includes, but is not limited to, the Pentium processor available from Intel Corporation, Santa Clara, Calif.

Output device 260 may include a device for providing outputs from processing device 220. Output device 260 may include, for example, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), tactile devices, haptic devices, audio speakers, etc.

Storage 230 may include one or more tangible non-transitory computer-readable media that may be configured to store instructions configured to implement illustrative embodiments of the invention. Storage 230 may be a primary storage accessible to processor 220 and may include a random-access memory (RAM) that may include RAM devices, such as, for example, Dynamic RAM (DRAM) devices, flash memory devices, Static RAM (SRAM) devices, etc. Storage device 230 may also include a magnetic disk and/or optical disk and its corresponding drive for storing information and/or instructions.

File container 100 may be a file residing in storage device 230. File container 100 may contain files such as files 120 and/or state file 130 containing state information 250.

Files 120 may include one or more files associated with one or more directories 110. Files 120 may be contained within file container 100. Files 120 may include XML files, source code, object files, bitmaps, vector drawings, The MathWorks® file types, etc. File container 100 and/or files 120 contained in file container 100 may be stored in storage device 230 in a compressed format. File container 100 and/or files 120 contained in file container 100 may be stored in a SCM and/or CM tool, for example.

State information 250 may be contained within file container 100, for example, as state file 130 or in some other form such as metadata. State information 250 may include state information regarding files 120 such as file names, checksums, file extensions, file classes, file sizes, file types, file creation dates, file modification dates, file access dates, file attributes, file status, file owners, file authors, file creators, file versions, file descriptions, number of files in file container 100, etc. The file class may include, for example, functional information (e.g., information about a code change) or non-functional information (e.g., information about a cosmetic change).

Input device 210 may allow, for example, a selection for creating a file container 100, saving file container 100, adding files 120 and/or directories 110 to file container 100, removing files 120 and/or directories 110 from file container 100, updating files 120 and/or directories 110 in file container 100, etc.

Processing device 220 may receive a request from input device 210 to modify file container 100. Processing device 220 may create file container 100 and may insert files 120 into file container 100. Processing device 220 may create state information 250 and may create and insert information about files 120 into the state information 250. Processing device 220 may also insert state information 250 into file container 100.

Processing device 220 may detect that a change to file container 100 or a change to one or more files 120 has occurred or is being requested. In response to the change, processing device 220 may calculate or recalculate information in the state information 250. Processing device 220 may also compare the change to file container 100 or one or more files 120 to obtain a comparison result which may include information on the change.

In another embodiment, changes to files 120 may not be considered changes to file container 100. In other words, a distinction may be made between changes to file container 100 and changes to the content of file container 100 (e.g., files 120). In another embodiment, file container 100 may store a bundle of files or references to files that belong together, without necessarily storing the content of the files, for example.

Processing device 220 may evaluate the comparison result to determine whether actions on the file may be desired. The evaluation process may produce an evaluation result that may contain an appraisal of derived files (e.g., object files, executable files, etc.) that may need to be regenerated. The appraisal may apply to code revalidation, code regeneration, code generation, simulation, resimulation, compiled information, model advisory checks, and/or no-substantive code changes, for example.

In another embodiment, the evaluation result may include a code revalidation appraisal, a code regeneration appraisal, a code generation appraisal, a no-substantive code changes appraisal, etc. A code revalidation appraisal may indicate whether the source code requires revalidation. A code regeneration appraisal may indicate whether the source code requires regeneration. A code generation appraisal may indicate whether the source code requires generation. A no-substantive code changes appraisal may indicate that the source code does not require revalidation, regeneration, generation, etc.

Processing device 220 may present reports, results, and/or appraisals using output device 260. Processing device 220 may receive additional input from input device 210 signaling, for example, acceptance of the change to file container 100 or one or more files 120. On receipt of acceptance signal, processing device 220 may implement the change to file container 100 or one or more files 120 and may update state information 250 accordingly.

Processing device 220 may receive a request from input device 210 for file container 100, files 120, and/or state information 250. Processing device 220 may compare state information 250 with another state file 130 and create a state file comparison result. Processing device 220 may identify one or more files 120 that have changed based on the state file comparison result. Processing device 220 may create a report based on the updated files, for example.

Processing device 220 may compress and/or decompress file container 100 and/or files 120 in file container 100. Files 120 in file container 100 may be compressed prior to committing into a CM and/or SCM tool. Files 120 in file container 100 may be decompressed on retrieval from a CM and/or SCM tool. Processing device 220 may decompress files needed for file comparisons without decompressing additional files, for example.

Alternatively, input device 210 and output device 260 may be remote to processing system 200. Processing device 220 may receive data, as described above regarding input device 210, from a remote location. Processing device 220 may transmit data, such as described above with regards to output device 260, to a remote location.

Example Change Summaries

Figure 3:
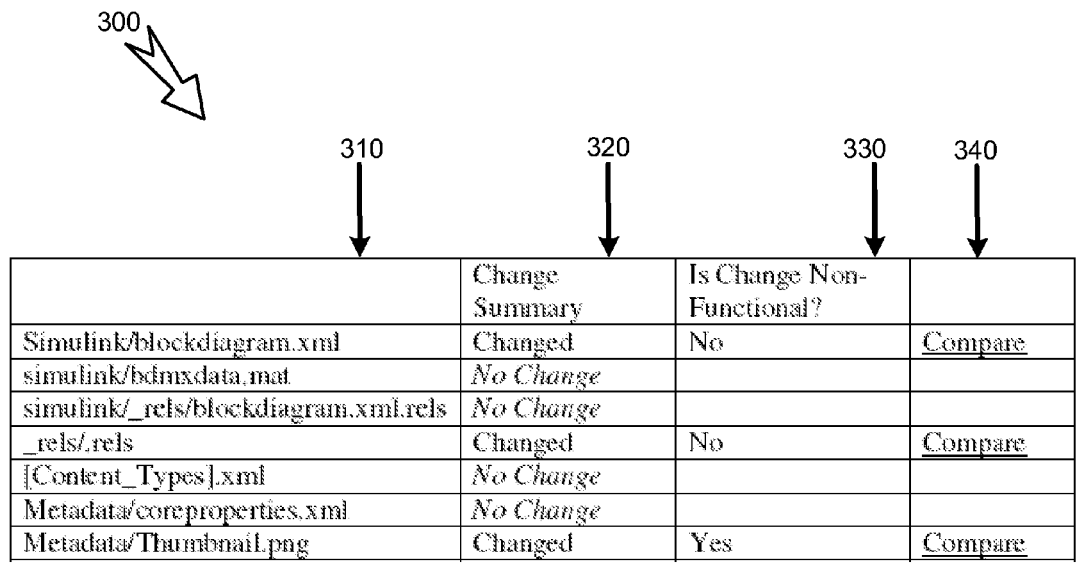
FIG. 3 illustrates a file change summary table in an illustrative embodiment.

FIG. 3 illustrates file change summary table 300 in an illustrative embodiment. File change summary table 300 may include file column 310, change summary column 320, file class column 330, and file compare operators 340.

File listing 310 may list all the files 120 in file container 100 by, for example, file name. File listing 310 may include state file 130.

Change summary column 320 may indicate which files 120 in file container 100 have changed.

File class column 330 may indicate whether a change to the file was a non-functional or functional change. In an example table 300, rows where no change has occurred, the change is neither functional nor non-functional and therefore has been left blank.

File compare operators 340 may provide a user with the ability to perform file comparison activities on changed files in file container 100. For example, selecting (e.g., clicking over) one of the "compare" hyperlinks may perform a comparison by extracting the two files to be compared and performing appropriate determined comparison operation upon them. For example, with Simulink XML files the Math-Works® Report Generator Simulink XML Comparison technology may be used. Performing a Simulink XML Comparison may generate a report summarizing the changes found between those Simulink XML text files, allowing the user to understand the impact of those changes upon their design. In rows where no change has occurred, no hyperlink may be supplied.

File compare operators 340 may provide a user with a graphical compare. The graphical compare may display using colored text, highlighted lines, unique block borders, etc., for example, differences between the original file content and the changed file content.

File compare operators 340 may also compare files of different names. For example, the contents of two file containers may be compared by pairwise matching, where files may be matched for comparison based on the least difference between each of the files in a pair, irrespective of the file names.

Once two file containers have been compared, the contents of the file containers may be merged into a single file container. A user may be prompted with the option to accept or reject changes to one of the file containers. Changes may be accepted or rejected on a per line and/or per file basis. Non-text based files such as binary files may also be merged.

Figure 4:
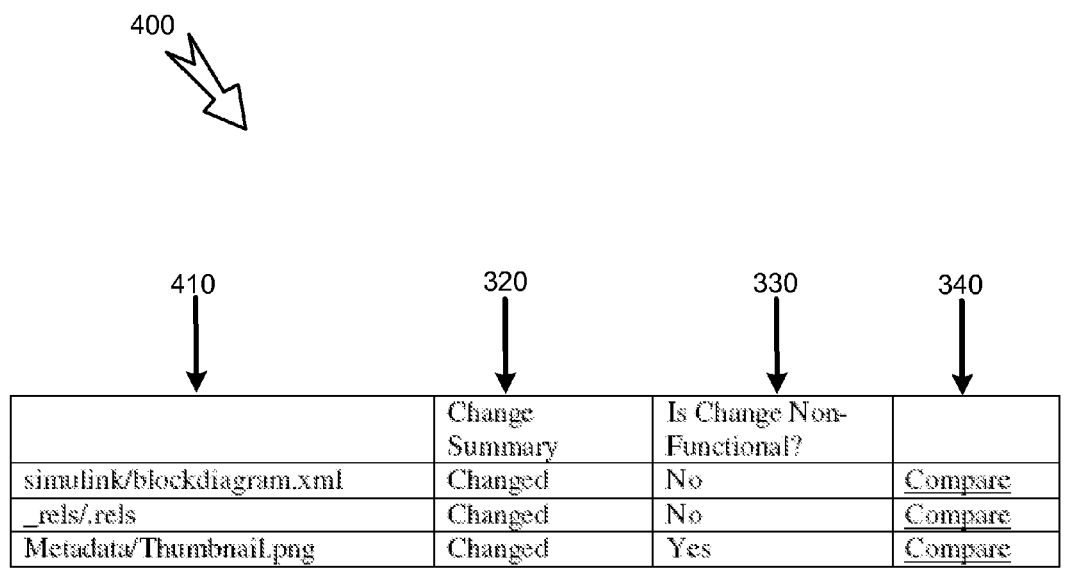
FIG. 4 illustrates a changed file summary table displaying changed files in an illustrative embodiment.

FIG. 4 illustrates changed file summary table 400 displaying changed files in an illustrative embodiment. Changed file summary table 400 may include columns similar to those in file change summary table 300. For example, changed file summary table 400 may include change summary column 320, file class column 330, and file compare operators 340. Changed file summary table 400 may show only changed files to reduce the amount of information displayed to the user. File listing 410 may display the files 120 in file container 100 that have changed and may hide the unchanged files. In changed file summary table 400, change summary column 320 lists all files that have changed. In practice, however, change summary column 320 may have identical values and, therefore, may be not included in changed file summary table 400.

Figure 5:
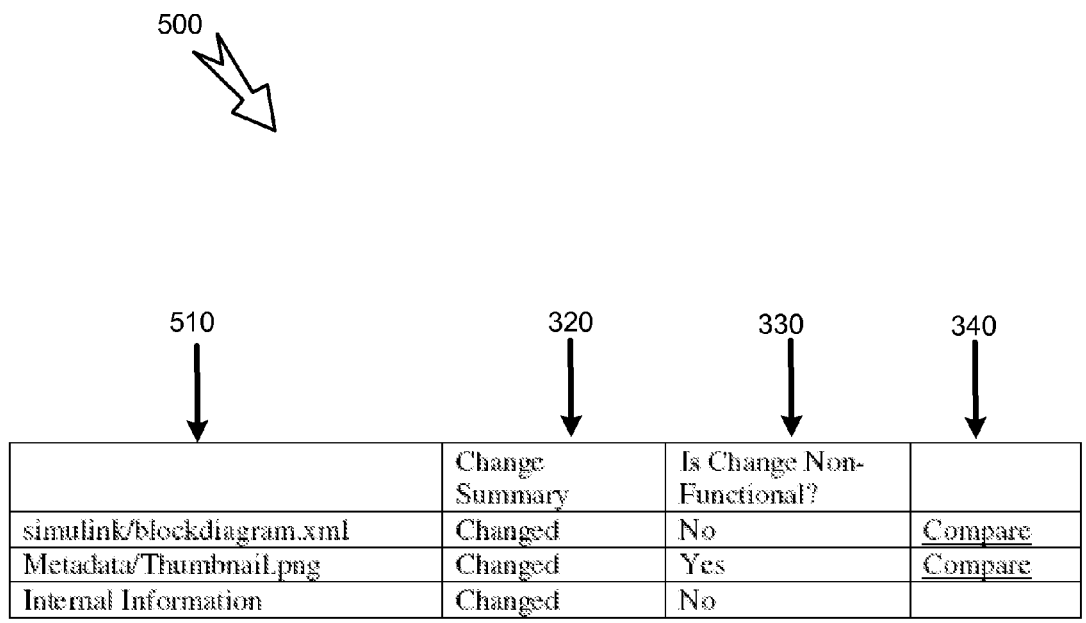
FIG. 5 illustrates a changed user file summary table in an illustrative embodiment.

FIG. 5 illustrates changed user file summary table 500 in an illustrative embodiment. Changed user file summary table 500 may include columns similar to those in file change summary table 300. Changed user file summary table 500 may include change information for one or more user files and can include change summary column 320, file class column 330, and file compare operators 340. Changed user file summary table 500 may hide file container architecture files (e.g., files in the file container 100 involved with the internal architecture on the file container 100 and not files 120 that may contain user files) and may show only changed, user files. By hiding file container architecture files, changed user file summary table 500 may display only pertinent user information and may help reduce the quantity of information displayed to the user. File listing 510 may display the files 120 in file container 100 that are not file container architecture files and that have changed. File listing 510 may hide file container architecture files and unchanged files. For example, file listing 510 may hide state file 130 even if state file 130 has changed as state file 130 may be a file container architecture file. As with changed file summary table 400, change summary column 320 may be not included in changed user files summary table 500.

Example Configuration Files

FIG. 6 illustrates example state file 130 that may maintain state information 250 in an illustrative embodiment. State file 130 may depict state information 250 providing file name and path, file size, modified file date, file checksum, and whether the file is nonfunctional. In this example, state file 130 is an XML file with each file in files 120 forming an XML node. Each node may contain the file size, when the file was last modified, the file checksum, and whether the file is nonfunctional. Additional state information for a file may be added to each node. If needed, state file 130 may be displayed to the user either in its raw format or an XML file reader may be used to help interpret the state information 250. State file 130 may be inputted into a program to perform analysis on state information 250 or as a comparison between two state files. State file 130 may be implemented in designs other than XML such as INI file format or in YAML (YAML Ain't Markup Languge), for example.

FIG. 7 illustrates example change categorization file 700 in an illustrative embodiment of the invention. Change categorization file 700 may contain a set of rules for a specific type of file container 100 to indicate which file types may be non-functional. For example, where the file container 100 contains files 120 for a software application, image files may be defined as non-functional (as shown in change categorization file 700). However, in a file container 100 that may be used to store documentation information, for example, changes to image files may be functional and change categorization file 700, as shown, may require modification.

Illustrative Processing

Figure 8:
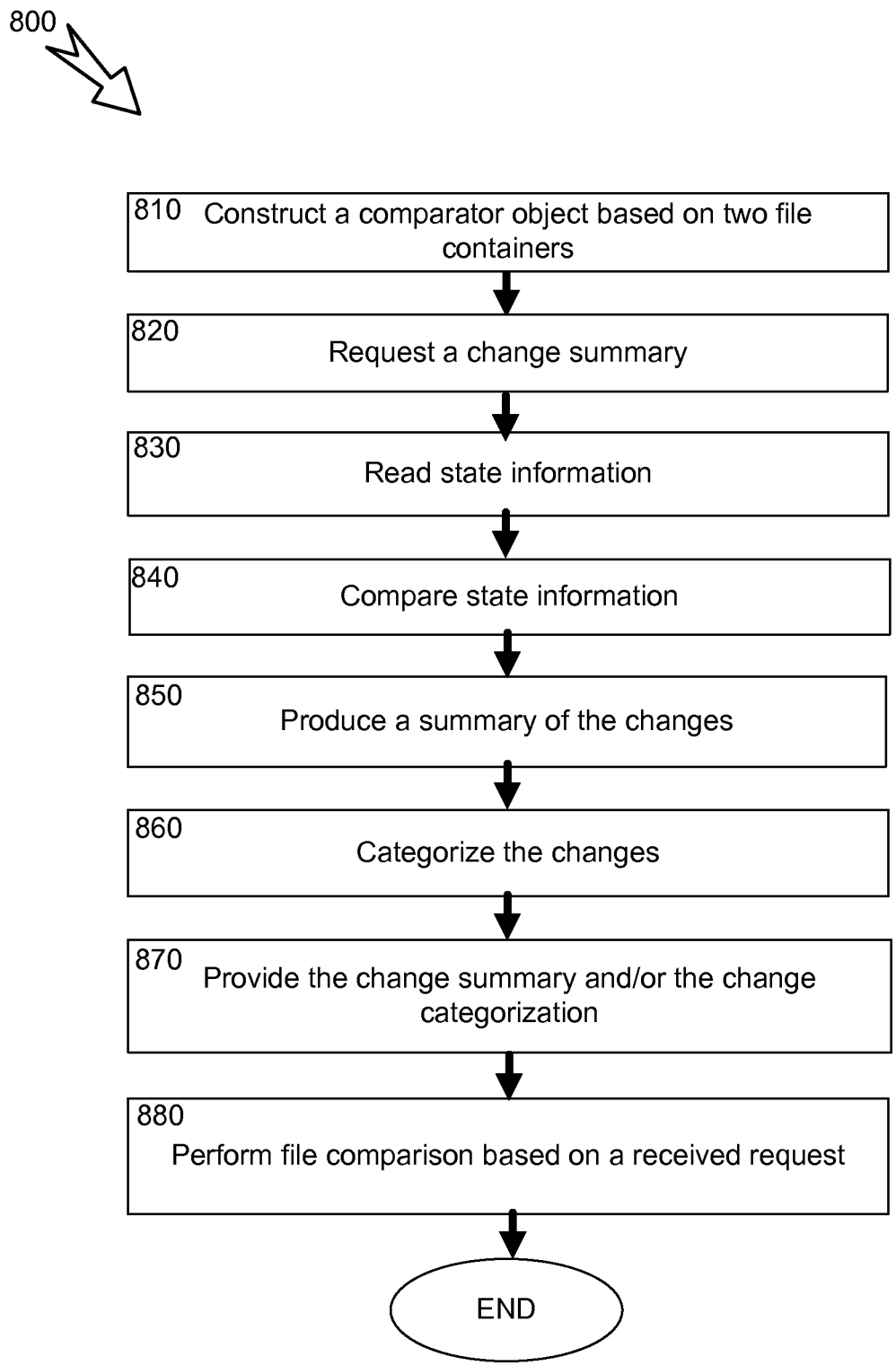
FIG. 8 illustrates an example flowchart describing processing performed on an existing file container in an illustrative embodiment.

FIG. 8 illustrates an example flowchart 800 describing processing performed on an existing file container 100 in an illustrative embodiment. In response to a request to compare two file containers, a comparator object may be constructed. The comparator object may be constructed based on two file containers (block 810). The comparator object has methods that may perform a sequence of operations to produce the results of the comparison of the two file containers. The two file containers may be stored in storage device 230, on a local disk, on a network drive, in a revision control system, in a database or in some other location. Each file container 100 may contain state information 250 and files 120.

An example comparator object may be constructed as follows:
    a_file_comparator=new file_comparator(file1, file2);

A change summary may be requested (block 820). The change summary may describe which files in the file containers have changed with respect to each other. The results of such a change summary may be displayed to the user in the form of FIG. 3, 4, or 5. An example change summary may be implemented as follows:
    change_summary=a_file_comparator.compare( );

State information 250 may be read (block 830). An example reading of the state files may be implemented as follows:
    statefile1=file1.read_statefile( );
    statefile2=file2.read_statefile( );

The above implementation may read the state files that are stored within file1 and file2. Reading the state files may retrieve or copy state information 250 from two different file containers into memory, for example.

Retrieved state information 250 may be compared (block 840). An example comparison may be implemented as follows:
    a_statefile_comparator=new statefile_comparator(statefile1, statefile2);
    statefile_comparison=a_statefile_comparator.compare( );

The compare method of a state file comparator may use a change detection algorithm that may be appropriate for, for example, linear information, graph information, hierarchically structured information, etc.

A summary of the changes may be produced (block 850). The result of comparing the two state files as in block 840 may produce a summary of the changes that have occurred in file1 with respect to file2. The changes may include multiple types of changes. For example, a file that exists in file1 but not in file2 (and vice versa); or a file exists in both file1 and file2, and some or all of the state information that corresponds to it has changed in statefile1 with respect to statefile2. The change summary may appear as, for example, file change summary table 300, changed file summary table 400, and/or changed user file summary table 500.

The changes may be categorized (block 860). Processing of the state file comparison may be used to categorize the changes. Example implementations may include:
    change_summary=statefile_comparison.categorize( ); or
    change_summary=statefile_comparison. categorize (change_categorization_definition);

Categorization may be performed for items that have changed or that have been added and/or deleted. Categorization may read state information 250 for the changed file to determine if the changed file may be denoted as non-functional. For example, categorization may determine if the changed file matches a definition of a non-functional change. The non-functional change indicator may be stored within the comparison program (e.g., a rule may specify that all images stored within file container 100 are regarded as non-functional). The non-functional change indicator may also be defined in an external data source such as an XML file such as change categorization file 700.

Once the type of change (e.g., functional or non-functional) to the file has been detected, any changed files may be flagged for review. If, for example, the change is cosmetic (non-functional), then the file may be flagged as a non-priority review. On the other hand, if the change is non-cosmetic (functional) the file may be flagged for priority review. Once the files are flagged, comparisons may be made only on files of a certain type (e.g., priority review) in the file container 100.

The change summary and/or the change categorization may be provided (block 870). For example, the change summary and/or change categorization may be provided to a user through a display (e.g., output device 260), to another computer system via a network, and/or to other software. An example implementation to display the change summary to the user may include:

change_summary.display( );

A file comparison may be performed based on a received request (block 880). The received request may originate from input device 210, from another computer system via a network, and/or from other software, for example. When reviewing the change summary or change categorization a user may wish to have the details of the difference between the original file and the changed file. Such details may be presented to the user when the user submits a file comparison request.

The example software code above may be implemented in various types of programming languages such as, but not limited to, MATLAB® by The MathWorks, Inc. language, C/C++, Fortran, Forth, ADA, Pascal, JavaScript, Python, C#, Java, Visual Basic, etc.

Figure 9:
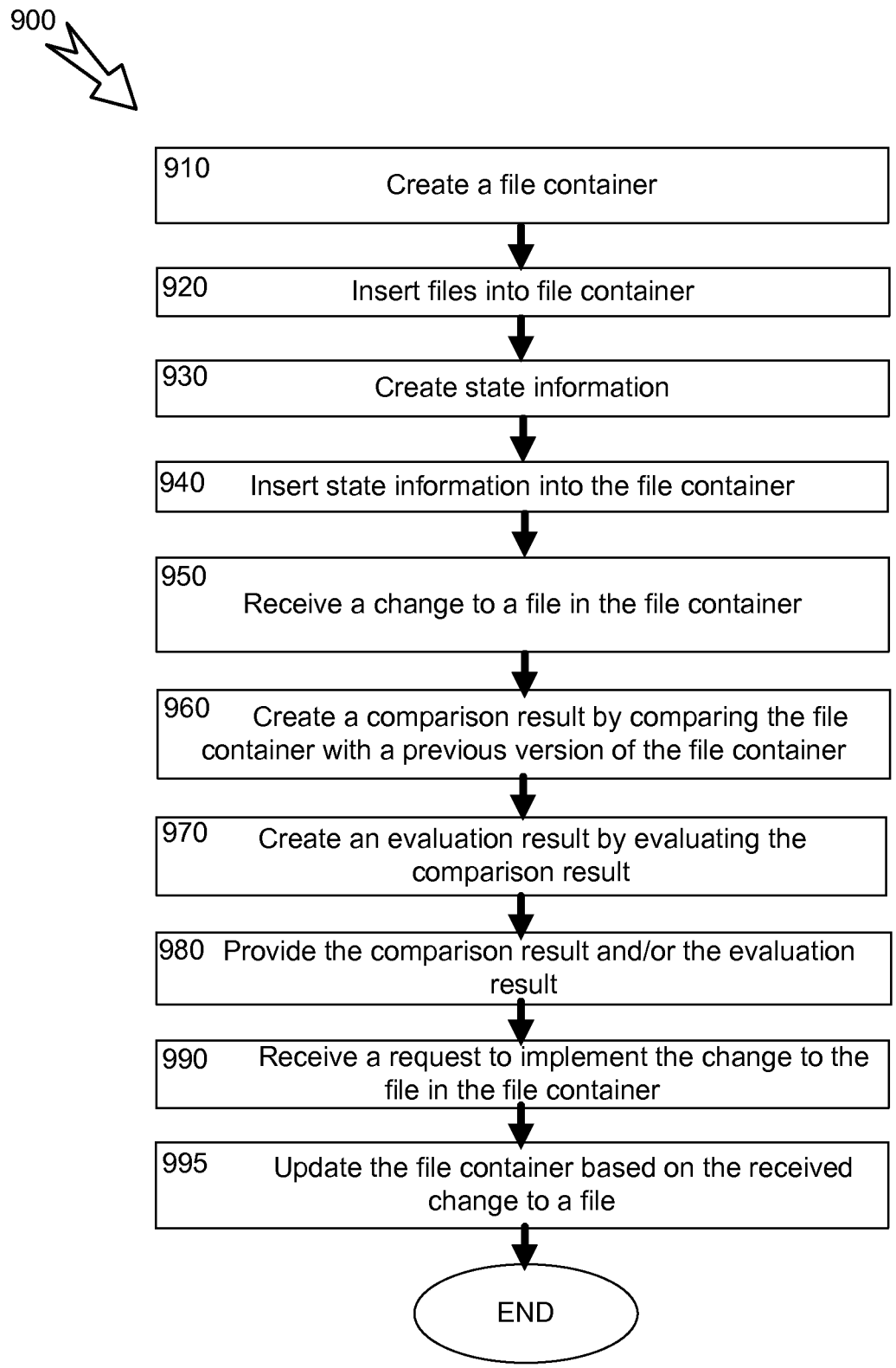
FIG. 9 illustrates an example flowchart describing processing performed on a new file container in an illustrative embodiment.

FIG. 9 illustrates an example flowchart 900 describing processing performed on a new file container 100 in an illustrative embodiment. File container 100 may be created (block 910).

Files 120 may be inserted into file container 100 (block 920). Files 120 may be compressed prior to insertion into file container 100.

State information 250 may be created (block 930). For example, state file 130 may be created and populated with file information of the files 120 in file container 100.

State information 250 may be inserted into file container 100 (block 940). State information 250 may be inserted as a file into file container 100 or as metadata contained in file container 100. In an embodiment, state information 250 may be located separate from file container 100. State information 250 may be stored in a database, for example, or other storage location. A reference to state information 250 may be included in file container 100. For example, file container 100 may contain a unique key that may provide a mapping from the instance of file container 100 to state information 250 stored in a database.

In an embodiment, file container 100 and/or state information 250 may be stored in, for example, databases, Software Revision Control Tools, Software Configuration Management Tools, or other storage locations for shared retrieval across projects based on reconstituting compatible configurations. Compatible configurations may include, for example, interface matching such as tests with same input output (I/O) modules, files with common ancestors, etc.

A change to a file may be received by file container 100 (block 950). A change may include adding one or more files 120 to file container 100, removing one or more files 120 from file container 100, or updating one or more changed files in file container 100. State information 250 may be updated based on the change to file container 100.

A comparison result may be created based on comparing the file container with a previous version of the file container (block 960). The file container may be based on the change of block 950 to file container 100 and the previous version of the file container may be based on the file container prior to the change. Files 120 to be compared may be decompressed prior to comparison.

An evaluation result may be created by evaluating the comparison result (block 970). The evaluation result may include at least one of a code revalidation appraisal, a code regeneration appraisal, a code generation appraisal, and/or a no-substantive code changes appraisal. The evaluation result may include an appraisal of the necessity to regenerate derived files. The appraisal may apply to code revalidation, code regeneration, code generation, simulation, resimulation, compiled information, model advisory checks, no-substantive code changes, etc.

The comparison result and/or the evaluation result may be provided (block 980). For example, the comparison result and/or the evaluation result may be shown to a user, provided to another software application, and/or may be transmitted to another computer system via a network. The comparison result and/or the evaluation result may appear as, for example, file change summary table 300, changed file summary table 400, and/or changed user file summary table 500.

A request to implement the change to file container 100 (from block 950) may be received (block 990). The user or software may instruct the system to implement the requested changes to file container 100.

File container 100 may be updated based on the proposed change (block 995). File container 100 may be modified with the proposed changes. State information 250 may be updated in file container 100 based on changes to file container 100 and files 120. The file container 100 and/or files 120 may be committed and/or extracted from a CM tool.

Example Alternate Embodiments

In an alternate embodiment, prior to file container 100 being added or checked in to a version control or software configuration management (SCM) system, files 120 may be extracted from file container 100 into individual files. Each individual file may be added to the SCM system in an appropriate folder structure. As a convenience to the user, the user may have no visibility to the fact that file container 100 had been expanded into individual files.

The following benefits may be achieved when file container 100 is expanded prior to submission to a SCM. Each file or component within file container 100 may have its own revision history. This may allow for more refined change-tracking. Additionally, storage of individual files may be more efficient than storage of a large file container 100. Efficiencies may be gained in saving only new versions of files 120 rather than saving the entire, binary file container 100 each time a new revision is checked in. Further, if some of the files 120 are stored as text, rather than binary, an additional advantage may be provided through the SCM tool's standard feature to store changes as deltas. Any combination of the above may have the potential to reduce the storage requirements for the SCM tool and may provide faster check-in times.

In an alternate embodiment, when file container 100 is checked out from a SCM system, files 120 may also be checked out of the SCM system and recombined into a single, appropriately named file container 100. A user who checks out file container 100 may have no visibility of the file recombination and may be presented with a checked out file container 100.

Improvements in speed may be seen when a user performs a SCM update operation to obtain a newer version of file container 100 from the SCM system. Increased speed may be achieved by retrieving only changed files as compared with getting the entire monolithic file container 100.

Improvements may be seen in describing the changes to file container 100 in the newer version in the SCM tool compared with a local working copy. The standard features of the SCM tool may be used to determine which of files 120 has changed and interpret changes of known file formats. For example, if only a thumbnail image stored within a Simulink file container has changed then the user may be informed that the newer version of the file contains only cosmetic, or nonfunctional, changes. The user may now have more information to determine if the newer revision is required, which may have implications for re-validating a project or regenerating code, for example.

Example Distributed System

Figure 10:
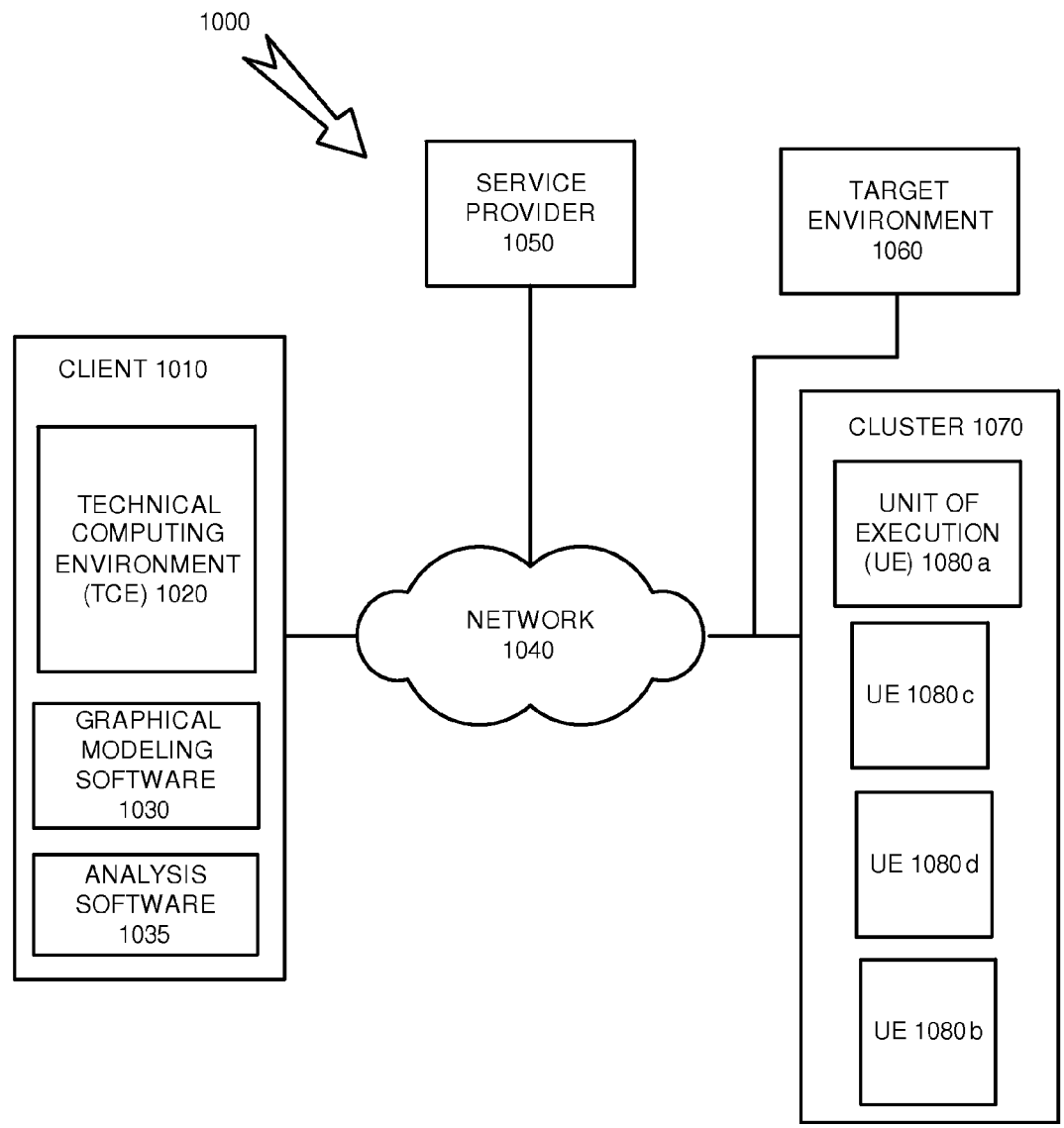
FIG. 10 illustrates a distributed environment that may be configured to practice an illustrative embodiment.

FIG. 10 illustrates distributed environment 1000 that may be configured to practice an illustrative embodiment. Referring to FIG. 10, environment 1000 may include a client 1010, network 1040, service provider 1050, target environment 1060 and cluster 1070. Note that the distributed environment illustrated in FIG. 10 is just one example of a distributed environment that may be used. Other distributed environments may include additional devices, fewer devices, or devices in arrangements that differ from the arrangement of environment 1000. For example, distributed environment 1000 can be implemented as a computing cloud if desired.

Client 1010 may include a device capable of sending and/or receiving information (e.g., data) to and/or from another device, such as target environment 1060. Information may include any type of machine-readable information having substantially any format that may be adapted for use, e.g., in one or more networks and/or with one or more devices. The information may include digital information and/or analog information. The information may further be packetized and/or non-packetized. In an embodiment, client 1010 may download data and/or code via network 1040. For example, client 1010 can download code for improved revision control consistent with aspects of the invention.

Client 1010 may be, for example, a desktop computer, a laptop computer, a netbook computer, a tablet computer, a client computer, a server computer, a mainframe computer, a personal digital assistant (PDA), a web-enabled cellular telephone, a smart phone, smart sensor/actuator, or another computation or communication device that executes instructions that enable the device to perform one or more activities and/or generate one or more results.

In an illustrative embodiment, client 1010 may include a technical computing environment (TCE) 1020, graphical modeling software 1030 and analysis software 1035. TCE 1020 may include a graphical block diagram environment that may be used to execute models and manipulate the models in accordance with techniques described herein. In other illustrative embodiments, client 1010 may include other components, applications, etc. Illustrative embodiments of TCE 1020 may contain computer-executable instructions (e.g., code) and data that are configured to implement the TCE. The instructions may include instructions configured to implement graphical modeling software 1020 and/or graphical analysis software 1035. An example embodiment of the invention may be implemented in a TCE 1010.

Modeling software 1030 and analysis software 1035 may be graphical, textual or a hybrid that includes both textual and graphical capabilities/features. Modeling software 1030 may include computer-executable instructions that allow, e.g., a user to build and/or execute a model. For example, modeling software 1030 may allow a user to build and execute a time-based model, a state-based model, an event-based model, a dataflow-based model, etc. An example embodiment of the invention may be implemented as part of modeling software 1030.

Analysis software 1035 may include computer-executable instructions that allow information in a model to be evaluated. Evaluating a model may include generating tests for the model that satisfy model coverage objectives (e.g., condition coverage, decision coverage, modified condition/decision coverage, and statement coverage), user-defined objectives, etc. In addition, evaluating a model may include proving various model properties and generating examples of violations of these properties. Moreover, evaluating a model may include analyzing the model, in accordance with techniques described herein. In an illustrative embodiment, analysis software 1035 may include the Simulink® Design Verifier software which is available from The MathWorks, Inc. An example embodiment of the invention may be implemented as part of analysis software 1035.

Network 1040 may include any network capable of exchanging information between entities associated with the network, including, for example, client 1010, service provider 1050, target environment 1060 and cluster 1070. Exchanged information may include, for example, packet data and/or non-packet data. Implementations of network 1040 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 1040 may include various network devices, such as, for example, routers, switches, firewalls, servers, etc. Portions of network 1040 may be wired (e.g., using wired conductors, optical fibers, etc.) and/or wireless (e.g., free-space optical (FSO), radio frequency (RF), acoustic transmission paths, etc.). Portions of network 1040 may include a substantially open public network, such as the Internet. Portions of network 1040 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

Service provider 1050 may include code (e.g., software), logic (e.g., hardware or a combination of hardware and software), etc., that makes a service available to another device in distributed environment 1000. Service provider 1050 may include a server operated by an entity (e.g., an individual, a corporation, an educational institution, a government agency, etc.) that provides one or more services to a destination, such as client 1010. The services may include software containing computer-executable instructions that may be executed, in whole or in part, by a destination, by service provider 1050 on behalf of the destination, or some combination thereof. An example embodiment of the invention may be implemented as part of service provider 1050.

For example, in an illustrative embodiment, service provider 1050 may provide one or more subscription-based services to various customers via network 1040. These services may be accessed by the customer (e.g., via client 1010). Service provider 1050 may limit access to certain services based on, e.g., a customer service agreement between the customer and service provider 1050. The service agreement may allow the customer to access services that allow the customer to build and/or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources used, network bandwidth used, etc.

Target environment 1060 may include a device that receives information from client 1010, service provider 1050, or cluster 1070. For example, target environment 1060 may receive executable code from client 1010, where the executable code allows target environment to perform an operation when the code is executed. Client 1010 may have generated the executable code using TCE 1020, graphical modeling software 1030, and/or a code generator (not shown in FIG. 10).

Cluster 1070 may include a number of processing resources that perform processing on behalf of another device, such as client 1010, service provider 1050 and/or target environment 1060. Cluster 1070 may include logic that manages and/or coordinates the operation of multiple processing resources. For example, cluster 1070 may send data to and/or receive results from these processing resources. In an illustrative embodiment, cluster 1070 may include units of execution (UEs) 1080*a, b, c,* and *d* (collectively UEs 1080) that may perform processing on behalf of client 1010 and/or another device, such as service provider 1050. An example embodiment of the invention may be implemented on one or more UEs 1080.

UEs 1080 may include hardware, software, or hybrid logic that perform processing operations on behalf of TCE 1020. For example, in an illustrative embodiment UEs 1080 may parallel process portions of a graphical model created by user of client 1010. This parallel processing may include performing analysis on the model, parsing the model into portions, and/or aggregating results from respective UEs 1080 into a single result for display to a user at client 1010. UEs 1080 may reside on a single device or chip or on multiple devices or chips. For example, UEs 1080 may be implemented in a single application specific integrated circuit (ASIC) or in multiple ASICs. Likewise, UEs 1080 can be implemented in a single computer system using virtualization techniques. Other examples of UEs 1080 may include field programmable gate arrays (FPGAs), complex programmable logic devices (CPLDs), application specific instruction-set processors (ASIPs), microprocessors, etc.

A TCE 1020 may include hardware and/or software based logic that provides a computing environment that allows users to perform tasks related to disciplines, such as, but not limited to, mathematics, science, engineering, medicine, business, etc.

In one implementation, the TCE 1020 may include a dynamically typed language that can be used to express problems and/or solutions in mathematical notations familiar to those of skill in the relevant arts. For example, the TCE 1020 may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

A TCE 1020 may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

A TCE 1020 may further provide mathematical functions and/or graphical tools (e.g., for creating plots, surfaces, images, volumetric representations, etc.). In one implementation, the TCE 1020 may provide these functions and/or tools using toolboxes (e.g., toolboxes for signal processing, image processing, data plotting, parallel processing, optimization, etc.). In another implementation, the TCE 1020 may provide these functions as block sets (e.g., an optimization block set). In still another implementation, the TCE 1020 may provide these functions in another way, such as via a library, etc. The TCE 1020 may be implemented as a text based environment, a graphically based environment, or another type of environment, such as a hybrid environment that is both text and graphically based.

Example software code listed above may be compiled and processed by processing device 220 and implemented in TCE 1020.

Illustrative Computing Architecture Example System

Figure 11:
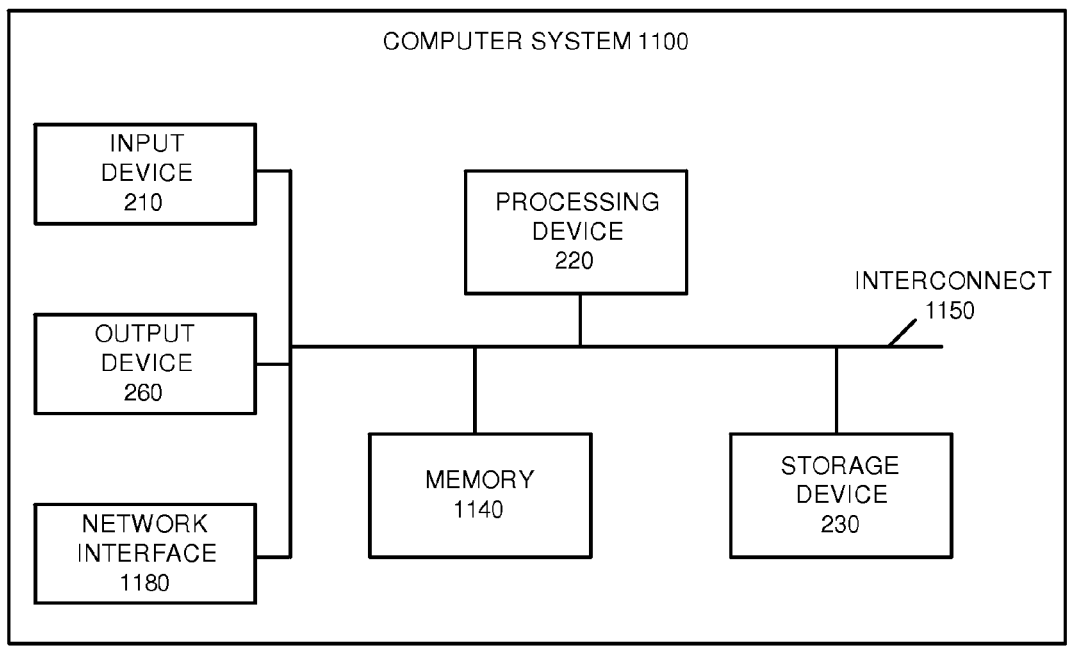
FIG. 11 illustrates an example computer system that may be configured to practice an illustrative embodiment.

FIG. 11 illustrates an example of a computer system 1100 that may be configured to practice an illustrative embodiment of the invention. For example, computer system 1100 may be used to implement processing system 200, client 1010, service provider 1050, target environment 1060, etc. Computer system 1100 may include processing device 220, memory 1140, storage device 230, input device 210, output device 260, interconnect 1150 and network interface 1180. For example, output device 260 may include logic configured to output information from computer system 1100. Processing device 220, input device 210, storage device 230, and output device 260 may be configured and implemented as discussed in FIG. 2.

Memory 1140 may be a computer-readable medium that may be configured to store instructions configured to implement illustrative embodiments of the invention. Memory 1140 may be a primary storage accessible to processing device 220 and may include a random-access memory (RAM) that may include RAM devices, such as, for example, Dynamic RAM (DRAM) devices, flash memory devices, Static RAM (SRAM) devices, etc.

Interconnect 1150 may include logic that operatively couples components of computer system 1100 together. For example, interconnect 1150 may allow components to communicate with each other, may provide power to components of computer system 1100, etc. In an illustrative embodiment of computer system 1100, interconnect 1150 may be implemented as a bus.

Network interface 1180 may include logic configured to interface computer system 1100 with a network, e.g., network 1040, and may enable computer system 1100 to exchange information with other entities connected to the network, such as, for example, service provider 1050, target environment 1060 and cluster 1070. Network interface 1180 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 1100 to any type of network.

It should be noted that illustrative embodiments may be implemented using some combination of hardware and/or software. It should be further noted that one or more computer-readable media that include computer-executable instructions for execution in a processor may be configured to store illustrative embodiments of the invention. The one or more computer-readable media may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an illustrative embodiment of the invention.

A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processing device 220. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment [e.g., MATLAB® software], a worker, a lab, etc.) that performs and/or participates in parallel programming activities. For example, a software unit of execution may perform and/or participate in parallel programming activities in response to receipt of a program and/or one or more portions of the program. In an illustrative embodiment, a software unit of execution may perform and/or participate in substantially any type of parallel programming using one or more hardware units of execution. Illustrative embodiments of a software unit of execution may support one or more threads and/or processes when performing processing operations.

Alternative Illustrative Embodiments

An alternative illustrative embodiment may implement a TCE 1020 using one or more text-based products. For example, a text-based TCE 1020, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Other illustrative embodiments may implement a TCE 1020 in a graphically-based TCE 1020 using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Another alternative illustrative embodiment may be implemented in a language that is compatible with a product that includes a TCE 1020, such as one or more of the above identified text-based or graphically-based TCE's 1020. For example, MATLAB® (a text-based TCE 1020) may use a first command to represent an array of data and a second command to transpose the array. Another product, that may or may not include a TCE 1020, may be MATLAB®-compatible and may be able to use the array command, the array transpose command, or other MATLAB® commands. For example, the other product may use the MATLAB® commands to suggest proper identifiers when an unrecognized identifier is presented.

Yet another alternative illustrative embodiment may be implemented in a hybrid TCE 1020 that combines features of a text-based and graphically-based TCE 1020. In one implementation, one TCE 1020 may operate on top of the other TCE 1020. For example, a text-based TCE 1020 (e.g., MATLAB®) may operate as a foundation and a graphically-based TCE 1020 (e.g., Simulink) may operate on top of MATLAB® and may take advantage of text-based features (e.g., commands) to provide a user with a graphical user interface and graphical outputs (e.g., graphical displays for data, dashboards, etc.).

CONCLUSION

Implementations may provide devices and techniques that may look inside file container 100 and detect changes within the individual files within the file container 100 to give greater insight into changes within the file container. This may provide greater understanding of a set of changes, the testing required to validate them, and the impact that the changes may have on the overall design.

State information 250 may improve the efficiency of typical operations performed upon file container 100. The use of state information 250 may provide an ability to easily and efficiently determine what type of change has been made to file container 100 when compared with an ancestor in, for example, a Software Revision Control system or a predecessor file stored on a file system.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 8 and 9, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 2, 10, and 11. depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and/or subheadings used herein are used to segment this patent application into portions to facilitate the readability of the application. These headings and/or subheadings are not intended to define or limit the scope of the invention disclosed and/or claimed in this patent application.

The scope of the invention is defined by the claims and their equivalents.

What is claimed is:

1. One or more tangible non-transitory computer-readable storage media for storing computer-executable instructions executable by processing logic, the media storing one or more instructions for:
    inserting files into a file container in a computing environment, wherein the files are used to generate one or more software applications derived from the files in the file container;
    storing state information by the computing environment, where:
        the state information includes file information for the files in the file container;
    receiving a change to a file in the file container in the computing environment;
    comparing the file container and a previous version of the file container to obtain a comparison result;
    providing the comparison result;
    determining whether the changed file is functional or non-functional by comparing a file type of the changed file with one or more rules for file types, the one or more rules being defined in a programmable change categorization file;
    generating an evaluation result to determine whether one or more actions on the files are desired, the evaluation result based on evaluating the comparison result and whether the changed file is functional or non-functional; and
    generating an appraisal result based on the evaluation result, the appraisal result indicating whether the one or more software applications derived from the files in the file container should be regenerated.

2. The media of claim 1, wherein the state information is included in a state file, as metadata regarding the file container, stored in the file container, or stored in a database.

3. The media of claim 1, further storing one or more instructions for:
    updating a configuration management system with the change to the file.

4. The media of claim 3, further storing one or more instructions for:
    updating the configuration management system with the file container after receiving the change to the file.

5. The media of claim 1, further storing one or more instructions for:
    merging the file container and the previous version of the file container.

6. The media of claim 1, wherein the appraisal result applies to at least one of:
    code revalidation, code regeneration, code generation, simulation, resimulation, compiled information, model advisory checks, or no-substantive code changes.

7. The media of claim 1, further storing one or more instructions for:
    compressing the file container and the files in the file container.

8. The media of claim 7, wherein comparing the file container and a previous version of the file container comprises:
    decompressing a file from the previous version of the file container.

9. The media of claim 1, further holding one or more instructions for:
    receiving a request to implement the change to the files in the file container; and
    updating the files in the file container with the change based on the request.

10. The media of claim 1, wherein the change comprises at least one of:
    saving the file container, adding additional files to the file container, removing files from the file container, or updating files in the file container.

11. The media of claim 1, wherein the file information comprises at least one of:
    file name, checksum, file extension, file class, file size, file type, file creation date, file modification date, file access date, file attributes, file status, file owner, file author, file creator, file version, file description, or number of files in file container.

12. One or more tangible non-transitory computer-readable storage media for storing computer-executable instructions, the media storing one or more instructions for:
    downloading the instructions of claim 1 to a computer system, which when executed by the computer system causes the computer system to perform operations comprising the downloaded instructions; or
    providing the instructions of claim 1 to a computer system, which when executed by the computer system causes the computer system to perform operations comprising the provided instructions.

13. One or more tangible non-transitory computer-readable storage media for storing computer-executable instructions, the media storing one or more instructions for:
    performing the instructions of claim 1 in a distributed environment.

14. The media of claim 1, further storing one or more instructions for:
    creating the file container; and
    creating the state information.

15. The media of claim 1, wherein the programmable change categorization file is XML based.

16. One or more tangible non-transitory computer-readable storage media for storing computer-executable instructions executable by processing logic, the media storing one or more instructions for:
    receiving a request for a file container, the file container containing a first file and associated with a first state information containing information about the first file;
    comparing second state information with the first state information to obtain a state information comparison result, the second state information containing information on a second file, wherein the first file and the second file are used to generate one or more software applications;
    identifying updated files based on the state information comparison result;
    determining whether the updated files are functional or non-functional by comparing a file type of the changed file with one or more rules for file types, the one or more rules being defined in a programmable change categorization file; and providing a file comparison report based on updated files and whether the updated files are functional or nonfunctional, wherein the file comparison report includes an appraisal result indicating whether the one or more software applications derived from the updated files should be regenerated.

17. The media of claim 16, wherein the first state information is stored in the file container.

18. The media of claim 16, further storing one or more instructions for at least:

retrieving the file container from a version control system; or updating the version control system with the file container.

19. The media of claim 16, wherein providing the file comparison report further comprises:

receiving an input associated with a selection of files, where the selection of files is related to the updated files;

producing a file comparison result using the selection of files; and incorporating the file comparison result into the file comparison report.

20. The media of claim 19, further comprising:

filtering the file comparison result based on functional changes or non-functional changes.

21. The media of claim 16, wherein the appraisal result comprises at least one of:

a code revalidation appraisal, a code regeneration appraisal, a code generation appraisal, or a no-substantive code changes appraisal.

22. The media of claim 16, wherein the request for a file container comprises at least one of:

retrieving the file container from a configuration management system, retrieving files from the file container from the configuration management system, adding additional files to the file container in the configuration management system, removing files from the file container from the configuration management system, or updating files in the file container in the configuration management system.

23. The media of claim 16, wherein the file information comprises at least one of:

file name, checksum, file extension, file class, file size, file type, file creation date, file modification date, file access date, file attributes, file status, file owner, file author, file creator, file version, file description, or number of files in file container.

24. A method for managing a configuration using a computer comprising:

examining a first group of files in a file container by the computer;

determining first state information on the first group of files by the computer, wherein the first state information includes a number of files in the first group of files;

recording the first state information in a file by the computer, where the file is further contained in the file container;

examining a second group of files;

determining second state information on the second group of files;

creating comparison information based on comparing the first state information and the second state information;

identifying functional or non-functional files based on the comparison information and by comparing a file type of the file with one or more rules for file types, the one or more rules being defined in a programmable change categorization file;

providing a report based on the comparison information, the report indicating whether one or more software applications derived from files identified as functional should be regenerated; and performing a file management event on the first group of files by the computer.

25. The method of claim 24, wherein the report further includes at least one of:

a result from comparing files;

a summary of file changes;

change information; or filtered change information.

26. The method of claim 25, wherein the change information comprises at least one of:

a code revalidation appraisal, a code regeneration appraisal, a code generation appraisal, or a no-substantive code changes appraisal.

27. The method of claim 24, wherein the file management event comprises at least one of:

saving the file container, adding additional files to the file container, removing files from the file container, or updating changed files in the file container.

28. A computer-implemented method, the method comprising:

downloading software to a computer system, which when executed by the computer system causes the computer system to perform operations comprising the method of claim 24; or providing software to a computer system, which when executed by the computer system causes the computer system to perform operations comprising the method of claim 24.

29. A computer-implemented method, the method comprising:

performing the method of claim 24 in a distributed environment.

30. A computer-implemented system for managing a configuration, the system comprising:

a storage device, the storage device storing:

a file container, the file container holding:

one or more files, wherein the one or more files are used to generate one or more software applications derived from the files in the file container;

state information on the one or more files of the file container;

an input device; and a processor configured to:

process a first command received from the input device, where the first command provides proposed files;

access one or more files in the file container based on the processing;

update the state information, the updating reflecting the accessing;

identify proposed files as functional or non-functional by comparing a file type of the changed file with one or more rules for file types, the one or more rules being defined in a programmable change categorization file;

create comparison information, where the comparison information:

is based on comparing the one or more files with the proposed files in response to the first command, and includes an appraisal result based on whether the proposed files are functional or non-functional indicating whether the one or more software applications derived from the files in the file container should be regenerated; and provide the comparison information.

31. The computer-implemented system of claim 30, wherein the appraisal result further comprises at least one of:

a code revalidation appraisal, a code regeneration appraisal, a code generation appraisal, or a no-substantive code changes appraisal.

32. The computer-implemented system of claim 30, wherein the first command comprises at least one of:

saving the file container, adding additional files to the file container, removing files from the file container, or updating files in the file container.

33. The computer-implemented system of claim 30, wherein the state information comprises at least one of:

file name, checksum, file extension, file class, file size, file type, file creation date, file modification date, file access date, file attributes, file status, file owner, file author, file creator, file version, file description, or number of files in file container.

34. One or more tangible non-transitory computer-readable storage media for storing computer-executable instructions executable by processing logic, the media storing one or more instructions for:

inserting a file into a file container in a computing environment, wherein the file is used to generate a software application derived from the files in the file container;

inserting state information into the file container in the computing environment, where:

the state information includes file information for the file in the file container;

receiving a change to the file in the file container in the computing environment;

comparing the change to the file in the file container to obtain a comparison result;

providing the comparison result;

determining whether the changed file is functional or non-functional by comparing a file type of the changed file with one or more rules for file types, the one or more rules being defined in a programmable change categorization file;

generating an evaluation result to determine whether one or more actions on the files are desired, the evaluation result based on evaluating the comparison result and whether the changed file is functional or non-functional; and generating an appraisal result based on the evaluation result, the appraisal result indicating whether the software application derived from the files in the file container should be regenerated.

* * * * *

UNITED STATES PATENT AND TRADEMARK OFFICE
CERTIFICATE OF CORRECTION

| | | |
|---|---|---|
| PATENT NO. | : 8,775,392 B1 | Page 1 of 1 |
| APPLICATION NO. | : 13/155059 | |
| DATED | : July 8, 2014 | |
| INVENTOR(S) | : Walker et al. | |

It is certified that error appears in the above-identified patent and that said Letters Patent is hereby corrected as shown below:

On the Title Page

(73) Assignee: "The Math Works, Inc., Natick, MA (US)" should be -- The MathWorks, Inc., Natick, MA (US) --

Signed and Sealed this
Twenty-eighth Day of October, 2014

Michelle K. Lee
*Deputy Director of the United States Patent and Trademark Office*